(12) United States Patent
Gienger et al.

(10) Patent No.: US 12,722,279 B2
(45) Date of Patent: Sep. 1, 2026

(54) COMPUTER-IMPLEMENTED METHOD FOR LEARNING MOVEMENT MODEL, NON-TRANSITORY COMPUTER-READABLE STORAGE MEDIUM AND HUMAN MOVEMENT ANALYZING SYSTEM

(71) Applicant: Honda Motor Co., Ltd., Tokyo (JP)

(72) Inventors: Michael Gienger, Offenbach (DE); Martina Hasenjäger, Offenbach (DE); Barbara Hammer, Bielefeld (DE); Jonathan Jakob, Bielefeld (DE)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 18/361,915

(22) Filed: Jul. 31, 2023

(65) Prior Publication Data

US 2025/0001584 A1 Jan. 2, 2025

Related U.S. Application Data

(60) Provisional application No. 63/524,208, filed on Jun. 29, 2023.

(51) Int. Cl.
*B25J 9/00* (2006.01)
*B25J 9/16* (2006.01)

(52) U.S. Cl.
CPC ........... *B25J 9/0006* (2013.01); *B25J 9/1607* (2013.01); *B25J 9/163* (2013.01); *B25J 9/1664* (2013.01)

(58) Field of Classification Search
CPC ........ B25J 9/0006; B25J 9/1607; B25J 9/163; B25J 9/1664
See application file for complete search history.

(56) References Cited

U.S. PATENT DOCUMENTS 10,319,209 B2 6/2019 Carlton-Foss
10,926,408 B1 2/2021 Vogelsong et al.
(Continued)

FOREIGN PATENT DOCUMENTS

CN 103514302 1/2014
CN 106308809 4/2019

OTHER PUBLICATIONS

Li et al. (Evaluation of Postural Sway in Post-stroke Patients by Dynamic Time Warping Clustering, FiHN, 2021, 13 pages) (Year: 2021).*
(Continued)

*Primary Examiner* — Oleg Korsak
(74) *Attorney, Agent, or Firm* — JCIPRNET

(57) ABSTRACT

A method for learning a person movement model includes obtaining a data stream having time series of measured multi-dimensional movement data of the person from at least one sensor; segmenting the data into time segments, segment corresponding to one movement step; storing each segment into a first storage section with a predetermined memory size, performing clustering of the segments by computing distances between the segments, learning a two-dimensional non-linear topology preserving embedded feature vector based on the computed distances, clustering the vectors, aligning segments of each cluster and averaging the aligned segments of for generating a prototype segment for each cluster; generating and storing a movement model by comparing the determined number of clusters of a current clustering with the determined number of clusters from the previous clustering stored in a second storage section.

20 Claims, 8 Drawing Sheets

(56) References Cited

U.S. PATENT DOCUMENTS

| | | | | |
|---|---|---|---|---|
| 2015/0235143 | A1* | 8/2015 | Eder | G16Z 99/00 706/12 |
| 2017/0087416 | A1* | 3/2017 | Hu | G16H 20/30 |
| 2017/0243354 | A1 | 8/2017 | Tafazzoli et al. | |
| 2020/0082212 | A1* | 3/2020 | Alcock | G06V 10/764 |
| 2020/0302187 | A1* | 9/2020 | Wang | G06V 20/52 |
| 2021/0379425 | A1* | 12/2021 | Tran | A62B 23/06 |
| 2022/0008719 | A1 | 1/2022 | Howard | |
| 2022/0066544 | A1* | 3/2022 | Kwon | G06T 7/251 |
| 2022/0187841 | A1* | 6/2022 | Ebrahimi Afrouzi | G05D 1/0272 |
| 2022/0301708 | A1 | 9/2022 | Gao et al. | |
| 2023/0358848 | A1* | 11/2023 | Dhekne | G01S 5/0264 |
| 2024/0310851 | A1* | 9/2024 | Ebrahimi Afrouzi | G01S 17/87 |

OTHER PUBLICATIONS

Drouin et al. (Semi-supervised clustering of quaternion time series: Application to gait analysis in multiple sclerosis using motion sensor data, SiM, 2022, 24 pages) (Year: 2022).*

Lorena Gril et al., "A Tensor-based Regression Approach for Human Motion Prediction", Qual Reliab Engng Int., Jun. 21, 2022, pp. 481-499.

Judith Bütepage et al., "Anticipating many futures: Online human motion prediction and synthesis for human-robot collaboration", arXiv:1702.08212v1 [cs.RO], Feb. 27, 2017, pp. 1-8.

Bin Fang et al., "Gait Neural Network for Human-Exoskeleton Interaction", Frontiers in Neurorobotics, Oct. 29, 2020, pp. 1-9.

Abdullah Alharbi et al., "Human Gait Analysis and Prediction Using the Levenberg-Marquardt Method", Journal of Healthcare Engineering, Feb. 18, 2021, pp. 1-11.

Mohammad Samin Yasar et al., "Improving Human Motion Prediction Through Continual Learning", arXiv:2107.00544v1 [cs. RO], Jul. 1, 2021, pp. 1-5.

Viktor Losing et al., "Incremental On-line Learning: A Review and Comparison of State of the Art Algorithms", Neurocomputing, Oct. 9, 2017, pp. 1-32.

Taizo Yoshikawa et al., "Machine Learning for Human Movement Understanding", Advanced Robotics, Feb. 10, 2020, pp. 1-30.

Bin Ren et al., "Motion Trajectories Prediction of Lower Limb Exoskeleton Based on Long Short-Term Memory (LSTM) Networks", Actuators, Feb. 26, 2022, pp. 1-15.

Viktor Losing et al., "Personalized Online Learning with Pseudo-Ground Truth", 2020 IEEE/RSJ International Conference on Intelligent Robots and Systems (IROS), Oct. 25-29, 2020, pp. 8963-8969.

Anne D. Koelewijn et al., "Predictive Simulations of Gait with Exoskeletons that Alter Energetics", bioRxiv, Sep. 1, 2021, pp. 1-18.

Viktor Losing et al., "Randomizing the Self-Adjusting Memory for Enhanced Handling of Concept Drift", 2020 IEEE/International Joint Conference on Neural Networks (IJCNN), Jul. 19-24, 2020, pp. 1-9.

* cited by examiner

COMPUTER-IMPLEMENTED METHOD FOR LEARNING MOVEMENT MODEL, NON-TRANSITORY COMPUTER-READABLE STORAGE MEDIUM AND HUMAN MOVEMENT ANALYZING SYSTEM

CROSS-REFERENCE TO RELATED APPLICATIONS

This application claims the priority benefit of US Provisional Application No. 63/524,208, filed on Jun. 29, 2023. The entirety of the above-mentioned patent application is hereby incorporated by reference herein and made a part of this specification.

BACKGROUND

Technical Field

The disclosure relates to the general field of exoskeleton control and human movement analysis, e.g., in rehabilitation. More specifically, a method and corresponding systems for learning, predicting, monitoring and controlling human movement in exoskeleton systems and rehabilitation systems is proposed.

Related Art

In classical machine learning predictions, models are learned in an offline or batch setting. Learning offline means using a given data set to train a model in a training phase. The trained model is subsequently applied to different data in the real world outside of the training setting in an application phase. Thus, the trained model can only respond accurately to novel data whose characteristics have been part of the training set. Contrary thereto, online or incremental machine learning refers to a type of learning in which the learned model is constantly updated with every new data sample that is observed in the environment. Online or incremental machine learning proves particularly useful when data is not completely available at any given point in time but rather arrives continuously in a potentially infinite data stream such as data measured from a sensor in the physical world, for example. Since measurements in the physical world are often subject to changing environments over time, such a scenario often necessitates the usage of an incremental model to assure accurate predictions over extended time horizons.

The disclosure concerns learning a prototype-based model to forecast and inspect human movements by predicting sensor values from data streams provided by sensors. A typical application is facilitating exoskeleton control. In this application, predicting sensor values for control is necessary since regularly electric motors drive the actuators of an exoskeleton, which require a certain time to adjust to a desired position. In order to have the actuators in the desired position at a desired time, a controller of the actuators of the exoskeleton must know the desired positions a certain amount of time in advance, so that the electric motors have the time to move the actuator to the required position. This is necessary to ensure that the exoskeleton provides adequate and timely support to its wearer whenever it is needed.

SUMMARY

A computer-implemented method for learning a movement model of a person comprises steps of obtaining a data stream comprising a time series of measured movement data of the person, in particular multi-dimensional movement data of the person from at least one sensor; segmenting the obtained data stream into time segments, wherein each time segment corresponds to one movement step; storing each time segment into a first storage section with a predetermined memory size; performing clustering of the time segments stored in the first storage section and extracting prototypes for each cluster. Clustering is performed by executing steps of: computing distances between the time segments stored in the first storage section using a dynamic time warping algorithm, learning a two-dimensional, non-linear, topology preserving embedded feature vector based on the computed distances using an uniform manifold approximation and projection algorithm to reduce the {n high-dimensional} time segments stored in the first data storage section to n feature vectors in two-dimensional space, and clustering the n feature vectors using an affinity propagation algorithm that determines the number of clusters automatically. Prototypes are extracted by aligning time segments of each cluster using a dynamic time warping algorithm and averaging the aligned time segments of each cluster for generating a prototype time segment for each cluster. The method then proceeds by generating and storing in a memory, a movement model by comparing the determined number of clusters of a current clustering with the determined number of clusters from the previous clustering stored in a second storage section, and in case the determined number of clusters of the current clustering is equal to the determined number of clusters from the previous clustering, merging individually the prototype time segments of the current clustering with the corresponding prototype time segments of the previous clustering, and in case of the determined number of clusters of the current clustering exceeding the determined number of clusters from the previous clustering, merging individually the prototype time segments of the current clustering with the corresponding prototype time segments of the previous clustering, and adding the current prototype time segments of the current clustering that have no corresponding prototype time segments in the previous clustering, and in case the determined number of clusters of a current clustering is smaller than the determined number of clusters from the previous clustering, merging individually the prototype time segments of the current clustering with the corresponding prototype time segments of the previous clustering, and retaining the previous prototype time segments of the previous clustering that have no corresponding prototype time segments in the current clustering.

The term incremental means that a movement model is continuously updated during deployment of the movement model. Deployment of the movement model refers to application of the model during operation in the real world, and in present case excludes a specific training of the movement model during a training phase on training data to generate a trained model, which is then transferred to the system in order to be subsequently employed in an application phase while the person is moving in the environment.

The term online generally is used to describe a system that is capable of live, real-time predictions, e.g., during deployment of an autonomously operating device (robot) or an exoskeleton. The term online may be understood here as a synonym for the term incremental.

The term offline denotes the opposite of the term online. Offline means that a model is static and does not continuously learn during deployment in an application phase.

The term prototype, here in particular prototype time segment, describes a data point with a dimension [n×1] that encompasses the average information of a cluster or class of other data points in n-dimensional space. In this context, the term prototype means the same but for a multi-dimensional time series of data points. Therefore, the dimensions of the prototype time segment are [n×t] for t successive time points in n-dimensional space.

BRIEF DESCRIPTION OF THE DRAWINGS

The aspects and implementation of the present disclosure will be explained in the following description of specific embodiments in relation to the enclosed drawings, in which.

Figure 1:
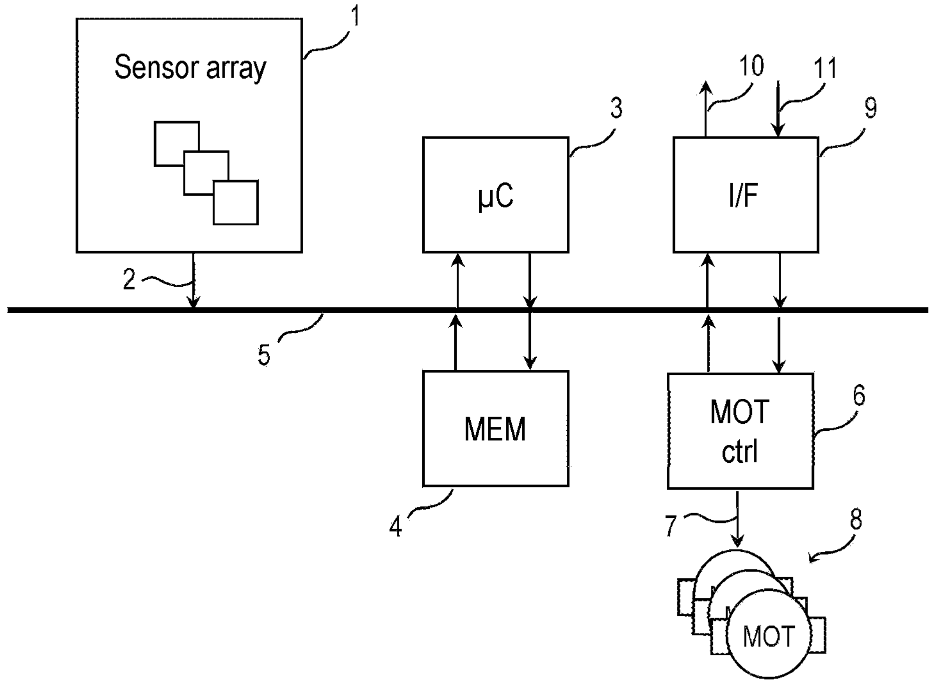
FIG. 1 displays a block diagram of a system architecture of a system for online movement learning, prediction and monitoring on which an embodiment can operate.

The description of FIGURES uses same references numerals for same or corresponding elements in different FIGURES. The description of FIGURES dispenses with a detailed discussion of same reference numerals in different FIGURES whenever considered possible without adversely affecting comprehensibility.

DETAILED DESCRIPTION

The disclosed method provides a modular incremental and online machine learning system that may observe data from various data stream sources. The method segments a continuous input stream provided by the data stream sources into a specific time series, clusters the segmented time series into similar patterns and builds an efficient prototype memory from these clustered patterns resulting in a maximal data space coverage with minimal data accumulation. This enables fast and accurate predictions without catastrophic forgetting on arbitrary time horizons as well as efficient storage and inspection of accumulated knowledge. The method achieves this effect without requiring offline training on previously recorded data albeit retaining the possibility of application in conjunction with other, either offline or online trained models. An application of the method and the corresponding system may aim at human gait learning in an autonomous manner without human interference. Applying the method in human gait learning may facilitate exoskeleton control for assisting a human, or enabling inspection of human gait of a person for rehabilitative purposes or even a combination of both applications.

A specific technical topic of operating in a dynamically changing environment is an issue termed personalization. Personalization refers to fitting pre-trained general models to specific persons (users), which requires further training on data relating to the specific user. However, if a product using a model, e.g., an exoskeleton, is shipped to the specific user without an expert being present who records data of the user and applies it to the model or personalization, then an approach of incremental learning has to be used. By incremental learning, particular characteristics of the specific user are learned automatically during application of the product with the user. Although being useful in such or similar scenarios, incremental learning approaches suffer from a general problem called catastrophic forgetting. Catastrophic forgetting describes a situation, where a model during the application phase forgets previously learned characteristics of the training data because they have not been present for a long time in the data stream during the application phase. However, in case forgotten characteristics reappear after a significant amount of time in the application phase has elapsed, the model has to relearn the forgotten characteristics, which leads to subpar predictions in the relearning phase and constitutes a situation that is disadvantageous in general.

To learn the prediction model, the method uses incremental learning, which has two specific aspects. In a first aspect, a pre-learned, non-adaptive model can only predict accurately in walking modes and specific terrain in the environment, e.g., stairs or slopes that were part of the training data. However, an inclination angle of slopes, or a height of stairs may vary widely in the physical world. Thus, it is virtually impossible to cover all instances in a pre-learned approach in the training data. In a second aspect, human movements are very individual and depend greatly on size, weight, stature, and many other factors of the physical body of a specific person. In order to achieve the best possible support for any given person, a specific model for the particular person has to be learned or a general pre-trained model has to be personalized by performing an adaptation process to the particular person. However, standard incremental learning may during application of the trained model run into some form of catastrophic forgetting. In the context of exoskeleton control catastrophic forgetting has the effect that the model that is predicting the upcoming motions of the exoskeleton has spent much time observing one specific walk pattern, e.g., during a long walk on flat ground, that it completely forgot other crucial movement patterns, e.g., which may include going down a flight of stairs. Encountering a situation of the flight stairs after the long walk on flat ground, the exoskeleton might fail in providing an adequate support for the user upon encountering the flight of stairs, which could result in at least undesired or even dangerous outcomes.

The method and corresponding system provide a design particularly suitable to learn human movement patterns in an online approach, without requiring human supervision and simultaneously avoiding the effect of catastrophic forgetting.

The specific design of the core estimator implementing the method leads to a number significant and advantageous effects.

Currently, there is no approach available that uses an incremental learning system (online learning system) to learn human movement patterns, in particular gait patterns, and to predict human movements for the use in exoskeleton control. Using such incremental learning system provides significant benefits, e.g., provides the potential of the movement model adapting to new environments hitherto not experienced by the moving person during actual application in the field. Moreover, the method using incremental movement learning provides a potential to personalize the movement model for any particular user without requiring human intervention during the learning. This characteristic renders the disclosed approach versatile in its application and highly cost effective. A further advantageous effect of the incremental online learning of movement models lies in the intrinsic capability of enlarging a prediction horizon for each physical step of the movement as soon as it becomes feasible. This enables an accurate planning for the mid phase and the end phase of the movement segment where stability is crucial, and, e.g., a physical support provided by an exoskeleton should be as accurate as possible.

Even more, currently exist no systems that a similar degree of observability of a learning process for learning a movement model for a person like the disclosed incremental learning method for learning a movement model and storing the learned model via the learned prototype time segments. This advantageous characteristic results in another effect by providing an inspection and observation capability for human movements which bases on a concise data structure, and efficient accessibility of the stored data. This may enable in a rehabilitative setting a long-term tracking of pathological human movements without the need of constant costly observation of a patient by a professional expert.

The method enables to learn time series of human walk patterns and even predict-them automatically without requiring human intervention during the learning. This advantageous effect enables personalizing of an exoskeleton to an end user in a highly efficient and cost effective manner, while simultaneously adequate predictions for movements of the end user are available even in previously unforeseen situations.

The learning of the movement model and the prediction in an application phase of the movement model of the core estimator are decoupled in their design. As soon as the memory is filled for the first time during application, predictions are possible at a maximal computational cost that can be tuned to the capabilities of the specific hardware of a particular exoskeleton device. The tuning to the hardware capabilities is achieved by limiting the maximum number of time segment prototypes stored in the memory. This may be balanced with the number of time points that each time segment includes after resampling (up-sampling).

Alternatively, the memory storing the movement model can be pre-filled, e.g., with a predetermined movement model.

The computational cost of learning the movement model can be tuned to the capabilities of the specific hardware of the exoskeleton device. This tuning of learning the movement model may be done by limiting a maximum size of the storage sections, which is directly related to the computational cost of feature engineering and clustering.

The movement model may handle predictions for a wide range of walking velocities. This is achieved by estimating the velocity and changing the prediction horizon accordingly.

The movement model can output complete sequences of an estimated physical step progression including information about when the step will terminate.

The movement model is designed to be used in combination with other movement models if so desired.

The movement model can provide its prototypes time segments, e.g., time segments of human walk of a particular person for a specific time interval, possibly even with associated meta information to the outside world for an offline inspection by a human expert.

The method according to an embodiment may include in the step of generating and storing the actual movement model interpolating each prototype time segment and resampling the interpolated prototype time segment to a predetermined data size.

The predetermined data size may exceed a value that results from a slow human walk sampled at a characteristic sampling frequency of an inertial movement unit (IMU) sensor.

In an embodiment, the predetermined data size corresponds to 200 data points, for example.

A characteristic sampling frequency of at least one sensor may correspond to, or be effectively equal to 60 Hz.

A particular embodiment of the method includes further steps of storing the time segments and the learned embedded feature vectors of a previous clustering into a second storage section; storing the generated prototype time segments for each cluster of a previous clustering into a third storage section; counting and storing a number of the movement measurements included in each time segment; determining, for a new obtained vector of measured multidimensional movement data, a nearest neighbor from the prototype time segments stored in the memory, retrieving the counted number of movement measurements from a previous cycle; determining a predicted movement vector as a vector of measured multidimensional movement data included in the prototype time segment of the determined nearest neighbor that is int (predetermined data size/counted number of the movement measurements) later than the determined nearest neighbor.

The operation int (a/b) returns the expression (a divided by b) to the equivalent integer number.

The computer-implemented method according to an embodiment further comprises determining further predicted movement vectors of the prototype time segment of the determined nearest neighbor in case determining, for a new obtained vector of measured multidimensional movement data, a nearest neighbor from the prototype time segments stored in the memory results in determining the nearest neighbor from the same prototype time segment plural times in a row, in particular at least a predetermined number directly one after another.

According to a specific embodiment, the predetermined number is between three and seven, in particular the predetermined number may be five.

The computer-implemented method according to an embodiment further comprises estimating and outputting based on the determined nearest neighbor being from the same prototype time segment plural times in a row, an estimation how and when the current movement associated with the current time segment is predicted to end.

According to an embodiment, the method further comprises storing and outputting, by a data interface, the prototype time segments stored in the memory after a predefined time interval has elapsed.

The predefined time interval may correspond to one day, one week, or one month.

The computer-implemented method according to an embodiment further comprises storing and outputting, by the data interface, meta information for the current predefined time interval of each or all movements associated with the prototype time segments stored in the memory after a predefined time interval has elapsed.

The meta information may comprise at least one of a number of movements and duration of movements.

The method may determine the nearest neighbor using a k nearest neighbor algorithm (kNN).

The method may be performed online during movement of the person.

The at least one sensor includes an IMU sensor array.

The method according to an embodiment comprises estimating a velocity of the movement by counting a number of the movement measurements of each time segment for a constant sampling rate of at least one sensor.

A second aspect concerns a non-transitory computer-readable storage medium embodying a program of machine-readable instructions executable by a digital processing apparatus, causing the digital processing apparatus to perform operations according to one of the embodiments of the computer-implemented method.

A third aspect concerns an exoskeleton comprising a plurality of actuators; a predictive controller configured to control the plurality of actuators based on a movement prediction signal; at least one sensor for generating a data stream comprising a time series of measured multi-dimensional movement data of the person; and a human movement analyzing system comprising at least one processor and at least one memory, wherein the movement analysis system is configured to perform the computer-implemented method according to one of the embodiments for generating the movement prediction signal including the predicted movement vector.

The exoskeleton according to one embodiment includes at least one processor configured to run software including a core estimator module for generating a first movement prediction signal including the predicted movement vector by performing the method according to one of the embodiments of the computer-implemented method according to the first aspect, and the at least one processor is further configured to run software including at least one further estimator module for generating a second movement prediction signal including a second predicted movement vector; and the at least one processor is further configured to run software including an aggregation module configured to generate the movement prediction signal by selecting either the first movement prediction signal or the second movement prediction signal, and outputting the selected first movement prediction signal or second movement prediction signal to the predictive controller, wherein the aggregation module is configured to monitor a quality of a prediction of the first movement prediction signal and the second movement prediction signal, and to select either the first movement prediction signal or the second movement prediction signal based on the monitored quality.

A fourth aspect concerns a human movement analyzing system that comprises a human movement analyzing system comprising at least one processor and at least one memory, wherein the movement analysis system is configured to perform the computer-implemented method according to the first aspect for generating the movement model; and the human movement analyzing system comprises a data interface including the memory for storing and outputting the stored movement model via a human-machine interface.

The incremental learning algorithm learns a model for human movements from IMU sensor data that may adapt itself to new environments, e.g., stairs of different heights and shapes, slopes of different inclination angles, flat and rough surfaces of a different degree of unevenness.

The incremental learning algorithm enables adapting the movement model without external support by an expert, e.g., automatically, to particular persons, thus providing a new personalization capability. The incremental learning algorithm learns gait patterns of the person automatically without human interference. The incremental learning algorithm may operate over extended periods of time without suffering from catastrophic forgetting.

The incremental learning algorithm may tune its computational and storage requirements to the specific capabilities of an available hardware set on which the incremental learning algorithm is implemented.

The incremental learning algorithm may even extract meaningful time segments associated with specific elementary movement, e.g., steps, from a continuous input data stream provided by a sensor array. Furthermore, the incremental learning algorithm has the capability to estimate a human movement velocity from an input continuous sensor data stream.

The incremental learning algorithm may extract ordering information and build classes from a set of segmented time sequences. The incremental learning algorithm may furthermore create prototype time segments for determined clusters (classes) for human movement patterns.

The prediction module predicts an IMU sensor data stream based on the learned movement model and a current sensor data stream. The prediction module generates predictions for arbitrary but meaningful time horizons, and for arbitrary movement velocities.

The prediction module may automatically adjust the prediction horizon for which it provides predictions.

The prediction module may even predict the end of a current physical movement, e.g., a step associated with a current time segment.

The prediction module may predict the further progression of sensor values until the end of the current physical movement, e.g., the step associated with the current time segment.

The prediction module is designed to operate without interference of the incremental learning process running independently in parallel.

The prediction module may adapt its computational and storage requirements to the specific capabilities of available hardware on which the prediction module is implemented.

The data interface may efficiently store human gait patterns in prototype form by storing the representative prototype time segment for each determined cluster of time segments. The data interface can store the prototype time segments generated over arbitrary time intervals. The data interface can store the metadata of the prototype time segments associated with the prototype time segments and, thus, associated with the determined clusters of time segments. The data interface can store the meta data of the movement data underlying the prototype time segments. The data interface may provide all data to the outside world. The data interface may work independently from the learning process and the prediction process.

The disclosure may comprise a prediction aggregation module that enables the system to incorporate predictions from other models by providing a method that tracks the prediction quality of all prediction models on meaningful time horizons and decides which time horizon should be used as the basis for the prediction quality evaluation.

Embodiments of the incremental learning algorithm facilitate exoskeleton control by providing forecasts of the next internal state of the exoskeleton before the next internal state actually materializes. The method provides the capability to decide from which time point onwards it is possible to facilitate longer horizon predictions. The prediction module operating on the learned movement model provides predictions of the progression of internal states until the end of the current physical step before the predicted internal states even materialize. In particular, the prediction module may provide a prediction of how, when, and where a current movement, e.g., a physical step, will end.

The data interface in combination with the incremental learning algorithm facilitates rehabilitative human movement monitoring, by: recording human movement data provided by wearable IMU sensors, aggregating efficiently specific and meaningful movement patterns into prototype time segments, saving, storing, and re-learning prototype time segments for arbitrarily settable time intervals. The data interface may store metadata for all generated prototype time segments. The data interface may enable visualizing prototype movement patterns by generating and outputting videos in human perceivable form.

FIG. 1 displays a block diagram of structural components of a system architecture suitable for a system for online movement learning, prediction and monitoring, on which an embodiment of the method can operate.

The method uses online measured movement data as input. At least one sensor 1 measures the movement data online and outputs the movement data as a sensor signal 2 (sensor signal data stream 2) for further processing to at least one processor 3 via a communication bus 5.

At least one sensor 1 may include an array of sensors, which measure acceleration in different spatial directions. In particular, the sensor 1 may include an array of inertial measurement units. An inertial measurement unit (IMU) is an example for a sensor, usually implemented as an electronic device that measures and outputs a specific force, an angular rate, and sometimes a spatial orientation of a body. The IMU may include a combination of accelerometers, gyroscopes, and sometimes magnetometers for measuring. Besides navigation applications, IMUs may serve as orientation sensors in many consumer products, e.g., smartphones and tablet computers contain IMU sensors acting as orientation sensors. Fitness trackers and other wearables may also include IMU sensors to measure motion parameters of a person.

The sensor signal 2 corresponds to a sensor signal data stream, which includes a time series of state vectors that describe the motion of physical bodies and body parts in the physical environment (real environment).

The sensor 1 may provide the sensor data stream may, for example, with a sample rate of 60 Hz.

The processor 3 provides the computation resources for performing the computer-implemented method together with the memory 4. The processor 3 may have processing architecture that comprises one or plural individual electronic processing circuits, signal processors, microprocessors, integrated circuits and further electronic components.

The memory 4 provides data storage for capability for storing program data of the computer-implemented method, in particular program data that includes a plurality of executable software modules. Furthermore, the memory 4 provides data storage capacity for storing data generated while executing the computer-implemented method in an application phase. Furthermore, the memory 4 provides data storage capacity for storing the movement model, in particular the movement model, and prototype time segments for clusters of time segments.

The system displayed in FIG. 1 further comprises a data interface 9, which is configured to transmit digital data to other electronic devices via an output signal 10, and to receive digital data from the other electronic devices in an input signal 11.

The other electronic devices may include, but are not limited to, a computer terminal for further processing of digital data included in the output signal 10 and the input signal 11. The other electronic devices may include the computer terminal configured to perform processing for presenting a user interface to a human (human machine interface, HMI) for outputting the digital data in a perceivable format, e.g., in form of visualized data via a display, e.g., a monitor. Furthermore, the other electronic device may be configured to obtain inputs via an input means from the human operator, e.g., via a keyboard, a touch-sensitive area, a pointer or a mouse device.

The data interface 9 may in particular form part of a human movement analyzing system.

The other electronic data interface 9 may also include electronic data memory for storing digital data or be configured to store the digital data in the memory 4.

The data interface 9 in combination with the incremental learning algorithm facilitates rehabilitative exoskeleton adjustment, by providing a human specialist with movement monitoring capabilities. The data interface 9 in combination with the incremental learning algorithm may enable a human specialist to adjust the level of support of the exoskeleton based on the monitoring and outputting of movement patterns.

The system structure shown in FIG. 1 further includes a predictive movement controller 6. The predictive movement controller 6 forms in particular part of an exoskeleton, which applies an embodiment of the computer-implemented method. The movement controller 6 acquires the movement prediction signal and generates at least one actuator control signal 7 for controlling at least one actuator of the exoskeleton based on the acquired movement prediction signal.

In particular, the exoskeleton includes a plurality of actuators that are driven by (actuated by) electric motors 8 of the exoskeleton. The predictive controller 6 then corresponds or includes an electronic controller circuit for controlling at least one electric motor of the electric motors 8.

The electric motors 8 represent only one example for driving the actuators. For example, the actuators may include at least one of piezo-electric driven actuators, pneumatically driven actuators, hydraulic actuators, magnetically driven actuators, for example, that are driven by respective channels of a specifically an adapted predictive controller 6.

The data interface 9 is in particular a functional unit of the human movement analyzing system. The predictive controller 6 is in particular a functional unit of the exoskeleton. Nevertheless, both, the predictive controller 6 and the data interface 9 may be present in an embodiment applying the computer-implemented method.

Figure 2:
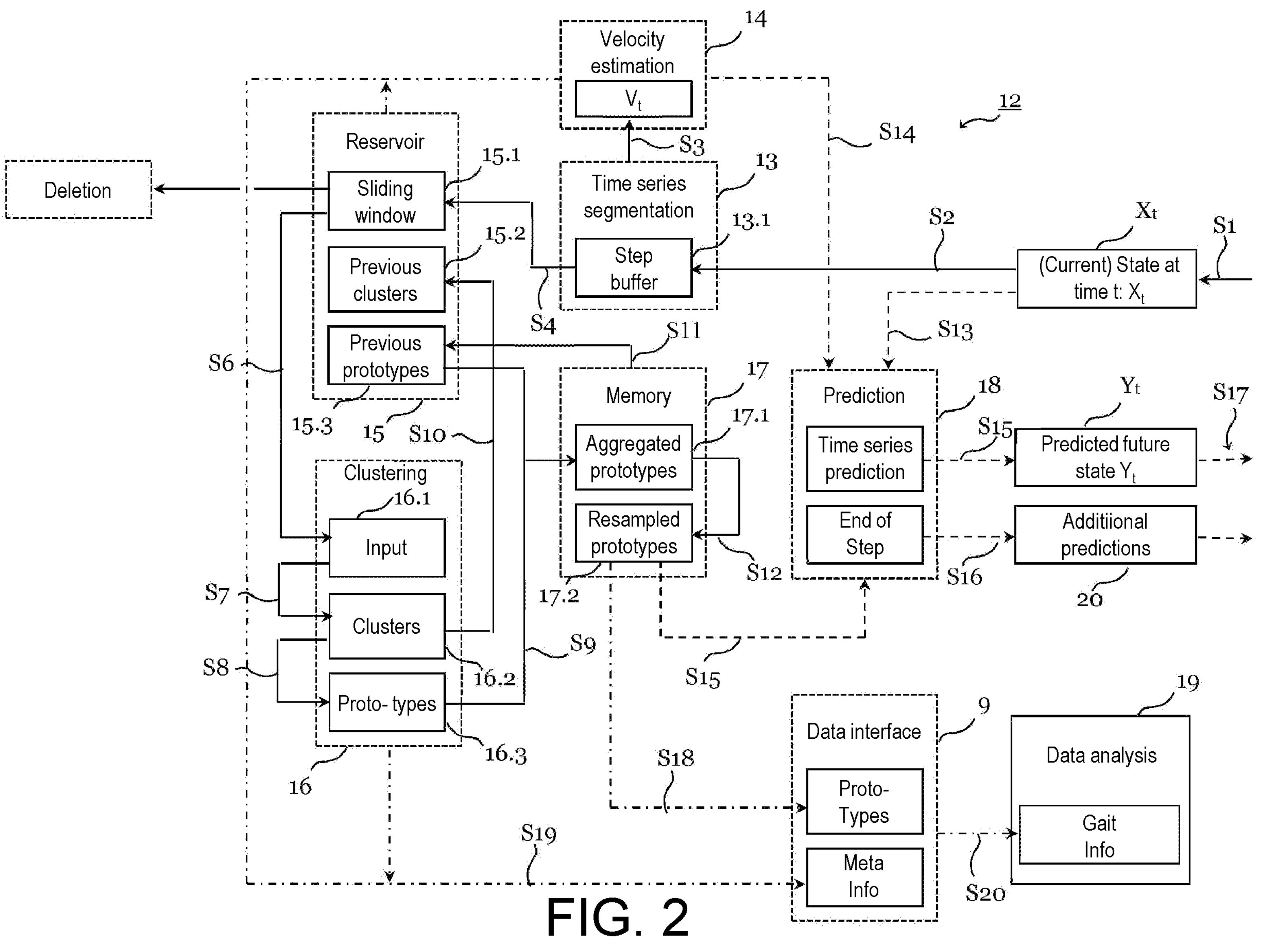
FIG. 2 displays a diagram of modular communications between functional modules of an embodiment.

FIG. 2 displays a diagram of communications between functional elements of a core estimator module of an embodiment. The discussion of the diagram of FIG. 2 refers to an example of human movement, human gait comprising a sequence of steps (walking steps), of an exoskeleton for supporting lower extremities and worn by a person, and to a gait pattern analysis performed via an external electronic device. Thus, the discussion of FIG. 2 represents a particular application example of the method for improving clarity.

The core estimator module 12 acquires sensor data streams from the at least one sensor, in particular from an IMU sensor array. The core estimator module 12 as depicted in FIG. 2 includes a number of submodules as functional units: a time series segmentation module 13, a velocity estimation module 14, a data storage module 15 (reservoir module 15), a clustering module 16, and a memory module 17.

Furthermore, the core estimator module 12 of FIG. 2 is shown together with an example of a prediction module 18, which may form part of the exoskeleton of a specific embodiment.

Furthermore, the core estimator module 12 of FIG. 2 is shown together with example of the data interface 9 (data interface module 9) and a further electronic device shown as a computer terminal 19 providing a data analysis and visualization capability.

The time series segmentation module 13 segments the acquired multi-dimensional (n-dimensional) sensor data stream into individual time segments, each time segment containing a sequence of state vectors $X_t$ associated with one physical step with either the left or the right leg of the person. The time series segmentation module 13 includes a step buffer for storing the determined time segments each including a sequence of state vectors $X_t$ associated with one physical step and each associated with the determined step.

The time series segmentation module 13 performs segmentation depending on the hardware of the specific exoskeleton. For example, if the exoskeleton encapsulates feet of the wearer using pressure sensors under soles of the exoskeleton, an accurate segmentation may be achieved by executing an algorithm that defines a step as going from a detected placing of a heel of a first foot on the ground until the subsequent placing of the heel of the other foot onto the ground, and vice versa.

Alternatively or additionally, segmenting the sensor data stream may include continuously or intermittently tracking an acceleration in a forward direction of the lowest IMU sensors of both legs of the exoskeleton. For example, the exoskeleton may include IMU sensors located at each ankle of the legs of the exoskeleton. Hence, a step may be defined from an onset of forward acceleration of one leg until the onset of the forward acceleration of the other leg of the exoskeleton.

The velocity estimation module 14 counts a number of measurements of each segmented time series that the time segmentation module 13 provides to the velocity estimation module 15 and stores the counted value for the most recent state vector in the time sequence. Assuming a constant sampling rate of the IMU sensor array, the actual walking velocity of the person may be computed from the number of measurements in a segmented physical step and a predetermined ground length of the step. The counted number of measurements may define an estimation model of the walking velocity.

The data storage module 15 (reservoir module 15) obtains the individual time segments from the segmentation module 15. The data storage module 14 provides a data storage with three distinct storage areas (compartments). A first data storage area 15.1 provides a fixed-sized sliding window over all incoming time segments. Once the first data storage area 14.1 is full, respective a data size of the first storage area 15.1 is reached, for every new incoming time segment, the earliest time segment stored in the first data storage area 15.1 is deleted (discarded).

The second data storage area 15.2 of the data storage module 15 stores the time segments and the embedded feature vectors of the time segments of a previous clustering cycle, which is discussed with reference to the clustering module 17 in more detail.

The third data storage area 15.2 of the data storage module 15 stores the prototype time segments for each determined cluster of the previous clustering cycle, which is discussed with reference to the clustering module 16 in more detail.

The clustering module 16 performs clustering of the data, which is stored in the first storage area 15.1.

In a particular embodiment of the clustering, a dynamic time warping algorithm (DTW) is used on the stored data to compute distances between all the time segments stored in the first data storage area 15.1 of the data storage module 15. A two-dimensional, non-linear, topology preserving embedding is learned using the UMAP algorithm from the computed distances. Thus, the n arbitrary long, high-dimensional time segments stored in the first storage area 15.1 are transformed into a plurality of n feature vectors in a 2-dimensional space. In the 2-dimensional space, the n feature vectors are then clustered using the affinity propagation algorithm (AP). The affinity propagation algorithm determines the number of clusters in the plurality of n two-dimensional feature vectors automatically. Subsequently, the time segments of each cluster are aligned using a dynamic time warping (DTW) algorithm and then averaged according to the alignment to form a prototype time sequence for each determined cluster.

The memory module 17 stores the actual movement model of the core estimator module 12. Thus, the memory module 17 stores the data that the prediction module 18 uses for predicting a future state $Y_t$. The memory module 17 may have the structural elements as depicted in FIG. 2. For generating the movement model stored in the memory module 17, the number of clusters from the current clustering as given by the clustering module is compared to the number of clusters from the previous clustering in the previous processing cycle as stored in the second data storage area 15.2 of the data storage module 15. If a number of clusters determined in the current processing cycle is the same as the number of clusters in the previous processing cycle, the new prototype time segments are merged individually with their counterpart of the prototype time segments of the previous processing cycle. If the number of clusters in the current processing cycle is exceeds (is higher than) the number of clusters determined in the previous processing cycle, the prototype time segments of current processing cycle that have a counterpart in the prototype time segments of previous processing cycle are merged. The prototype time segments of current processing cycle that have no counterpart in the prototype time segments of previous processing are retained, in particular stored in the memory module 17 as part of the aggregated prototypes in the respective aggregated prototype memory area 17.1 as they have been determined. If the number of clusters in the current processing cycle is smaller than the number of clusters determined in the previous processing cycle, the prototype time segments of current processing cycle that have a counterpart in the prototype time segments of previous processing cycle are merged with the prototype time segments of the previous processing cycle. The prototype time segments of current processing cycle that have no counterpart in the prototype time segments of previous processing are retained, in particular stored in the memory module 17 as part of the aggregated prototypes in the respective aggregated prototype memory area 17.1 as they are determined.

Retaining the prototype time segments of current processing cycle that have no counterpart in the prototype time segments of previous processing in the memory module 17 as part of the aggregated prototypes in the aggregated prototype memory area 17.1 has the advantageous effect of ensuring that catastrophic forgetting can be avoided. Then, each prototype time segment is interpolated and resampled to a fixed data size, e.g., a data size of 200 data points, which constitutes a larger number than what would result even from a very slow walk sampled at a typical IMU sampling frequency of 60 Hz in order to give a specific example. The up-sampled prototype time segments are stored in a resampled prototype time segment area 17.2 of the memory module 17.

The prediction module 18 may perform prediction using a simple k nearest neighbors (kNN) algorithm. When a new data vector of sensor measurements is received, the prediction module 18 determines a nearest neighbor to the received data vector of sensor measurements from the prototype time segments of the movement model currently stored in the memory module 17. Then, the prediction module 18 retrieves the number of measurements n_prev from the previous processing cycle from the velocity estimation module 14. The prediction module 18 predicts a future state $Y_t$ as the vector that is int ((number of data samples of a resampled prototype time segment)/(n_prev)) steps ahead of the previously determined nearest neighbor. The prediction module 18 tracks, which prototype time segments are selected in each processing cycle of the prediction procedure and stores this information associated with the respective prototype time segment and processing cycle. As soon as the prediction module 18 selects the same prototype time segment for more than a predetermined number of times in a sequence, the prediction module 18 performs an additional prediction that includes estimating a further progression of the current step as given by the currently selected prototype time segment, which results in an estimation of how and when the current physical step is predicted to end.

The data interface 9 represents a data interface for outputting data to a human observer. The human observer may be a data analyst or in particular a physiotherapist. The data interface 9 provides output of different types of data.

A first type of data output by the data interface 9 is data including the final prototype time segments of a pre-defined time interval of an arbitrary length of time, e.g., a day, a week, or a month. The data interface 9 collects the movement data, in particular the movement model including the prototype data samples, from the memory module 17 and the velocity estimation from the velocity estimation module 14 and stores the collected data including the movement model for human inspection.

A second type of data output by the data interface 9 is data including meta information of all the steps taken in the current pre-defined time interval, e.g., a number and a duration of steps, that the data interface 9 may collect and store as well.

The data interface 9 outputs the collected data in an output signal to the computer terminal 19 for inspection by the human observer. The computer terminal 19 may run processes for visualizing and displaying human gait information based on the obtained output signal received from the data interface. Processing, visualizing and displaying the data by the computer terminal 19 may be offline, contrary to the data generation by the core estimator module 12, which executes the processing steps incrementally and online while the person is moving, hence in an application or working phase of the exoskeleton.

Figure 3:
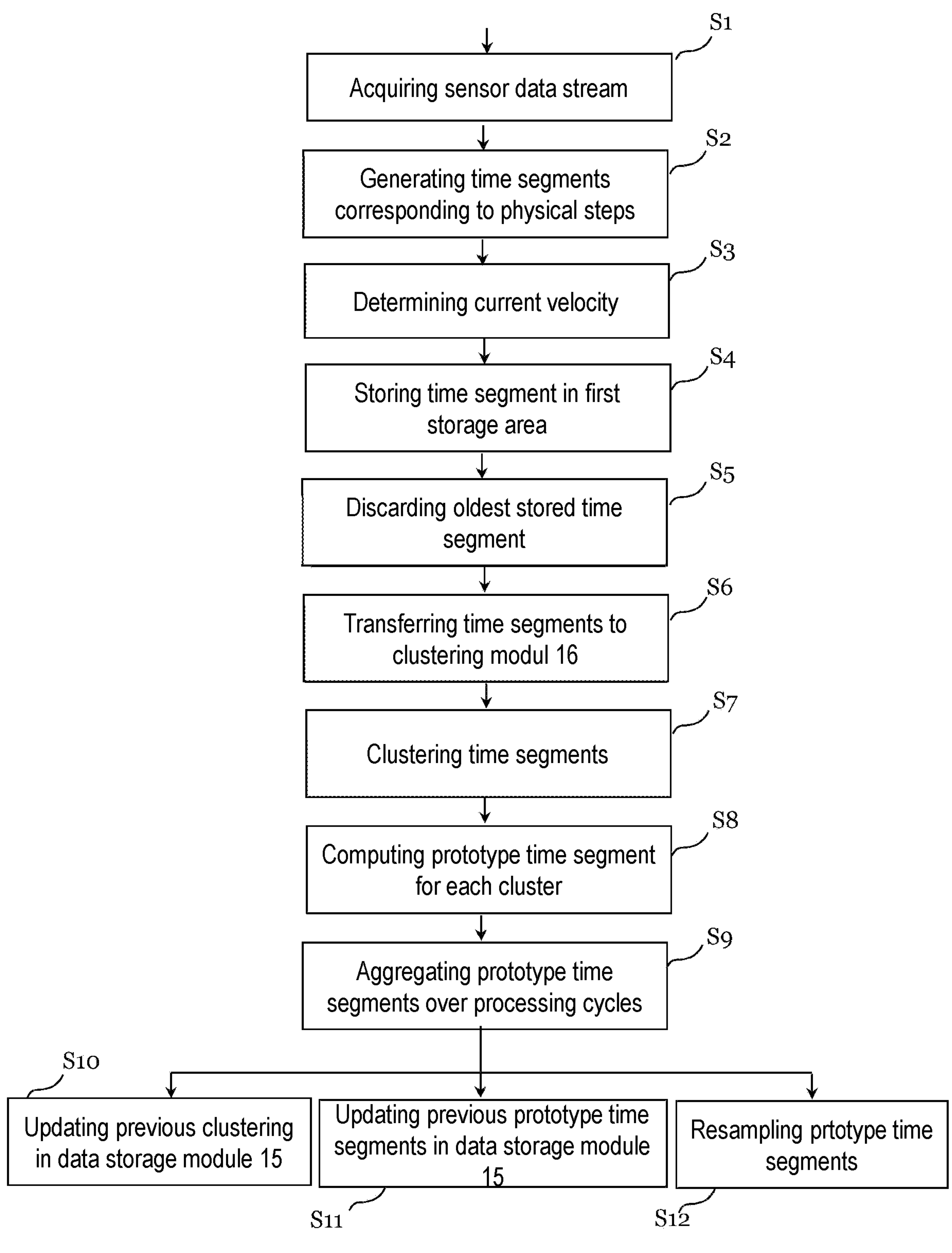
FIG. 3 displays a flowchart detailing operation of building a movement model in a memory of an embodiment.
Figure 4:
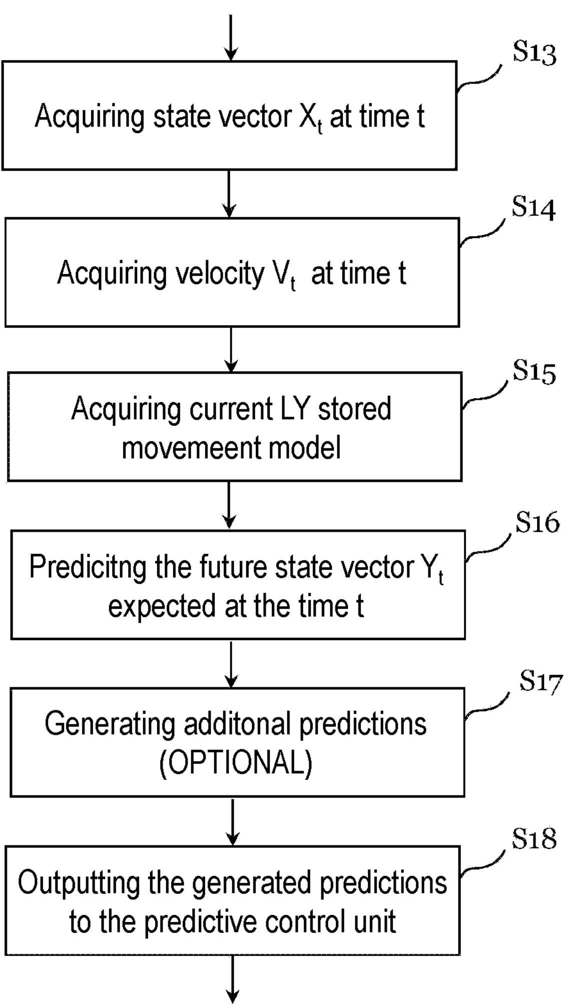
FIG. 4 displays a flowchart detailing operation of predicting movements based on the movement model stored in a memory of an embodiment.
Figure 5:
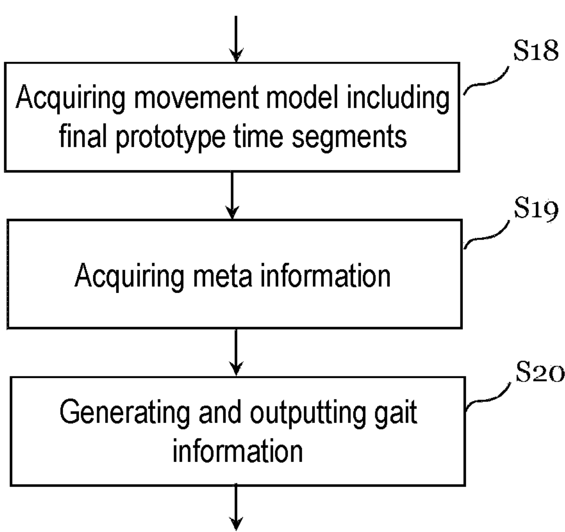
FIG. 5 displays a flowchart detailing operation of monitoring movement based on the movement model in a memory of an embodiment.

FIGS. 3, 4, and 5 illustrate the workflow of the core estimator module 12, which may be described by three quasi-independent processing paths. The processing paths are visualized and labelled in the functional processing diagram of FIG. 2.

A first processing path follows the solid line arrows, and the processing steps of the first processing path are numbered by reference numbers S1 to S12 discussed with reference to the flowchart of FIG. 3.

A second processing path follows the dot arrows in FIG. 2, and the processing steps of the second processing steps are numbered by reference numbers S13 to S18 discussed with reference to the flowchart of FIG. 4.

The third processing path follows the line-dot arrows in FIG. 2, and the processing steps of the second processing path are numbered by reference numbers S19 to S21 discussed with reference to the flowchart of FIG. 5.

FIG. 3 displays a flowchart detailing operation of building a movement model in the memory module 17 in an embodiment. The flowchart describes the process of generating the movement model then stored in the memory module 17 by executing the following sequence of steps:

The processing starts with a step S1 of acquiring the input data stream of sensor data (sensor data stream 2) from the at least one sensor 1. The input data comprises a sequence of sensor measurements included in a multidimensional state vector $X_t$.

The processing is cyclic or incrementally, wherein each process cycle processes one state defined by the multidimensional state vector $X_t$ at a time t.

In step S2, the core estimator module 12 transfers each state to the segmentation module 13. The segmentation module 13 aggregates all acquired consecutive state vectors of one particular physical elementary movement, e.g., a physical step (step) together into a sequence including a multidimensional time series of states, the sequence corresponding to one physical step termed the time segment.

In step S3, the segmentation module 13 provides, as soon as a time segment corresponding to one physical step is complete, the time segment to the velocity estimation module 14. The velocity estimation module 14 determines a current velocity from the obtained time segment.

In step S4, the segmentation module 13 provides, as soon as a time segment corresponding to one physical step is complete, the time segment to the first storage area 15.1 of the data storage module 15. The first storage area 15.1 has the structure of FIFO memory of a specific data size adapted to storing a predetermined number of time segments.

In step S5, the maximum number of time segments, which the first storage area 5.1 may store corresponding to a size of the sliding window, had been reached. Now, for storing a new current time segment provided from the step buffer 13.1 of the segmentation module 13, the oldest time segment stored is discarded (deleted) in order to store the current time segment.

The cycle of steps S4 and S5 of storing time segments in the first storage area 15.1 provides a sliding window over the time sequence of state vectors provided by the at least one sensor 1.

The oldest time segment is that time segment of all the time segments that are stored in the first storage area 15.1 at the start of the current processing cycle that had been stored first in the first processing area 15.1.

In step S6, after a number of n time steps has elapsed, the core estimator module 12 activates the clustering module 16 and transfers the time segments stored in the first data storage area 15.1 to an input data storage area 16.1 of the clustering module 16.

In step S7, the clustering module 16 determines the clusters in the obtained time segments. Each determined cluster is supposed to correspond to a different walking pattern distinguishing the cluster from the other determined clusters. The clustering module 6 stores the determined clusters in a cluster storage area 16.2. In particular, in step S7, the method is clustering the n feature vectors using an affinity propagation algorithm that determines the number of clusters automatically.

In step S8, the clustering module 16 computes one prototype time segment per cluster from clusters stored in the cluster storage area 16.2, and stores the computed prototype time segments of each cluster in a cluster storage area 16.3 of the clustering module 16.

Thereafter, in step S9, the core estimator module 12 aggregates the computed prototype time segments of the current processing cycle with the prototype time segments from the previous processing cycle, in particular the clustering step of the previous processing cycle, and stores the aggregated prototype time segments in the memory module 17.

In step S10, the core estimator module 12 replaces the previous clustering stored in the previous processing cycle into the second data storage area 15.2 of the data storage module 15 with the current clustering.

In step S11, the core estimator module 12 replaces the previous prototype time segments stored in the previous processing cycle into the third data storage area 15.3 of the data storage module 15 with the computed prototype time segments of the current processing cycle.

In step S12, the core estimator module 12 resamples the new prototype time segments computed in the current processing cycle stored in the aggregate prototype time segment memory area 17.1 and stores the resampled prototype time segments computed in the current processing cycle in the resampled prototype memory area 17.2 of the memory module 17. Thus, after executing step S12, the memory module 17 stores a new movement model of the current processing cycle.

FIGS. 2 and 3 provide an overview of the processing sequence and functional as well as structural elements of the core estimator module 12.

FIG. 4 displays a flowchart detailing operation of predicting movements based on the movement model stored in a memory of an embodiment and is subsequently discussed with reference to FIG. 2 for the corresponding functional structural elements.

The second processing path is largely independent from the first processing path insofar that as soon as a (first) movement model has been computed and stored in the memory module 17, the second processing path including the processing steps S13 to S18 can be executed.

Alternatively, the movement model may be preloaded into the memory module 17.

The generally complex and computationally demanding calculations in the first processing path discussed with reference to FIG. 3 accordingly do not adversely affect the overall speed of availability of the prediction performed in the second processing path. The processing flow of the first processing path including steps S1 to S12 and the processing flow of the second processing path including steps S13 to S18 can be executed independently from each other. The second processing path describes the prediction processing from inputting of a state vector $X_t$ in step S13 until outputting of a computed prediction in form of predicted state vector $Y_t$ in step S18. In particular, the second processing path comprises the following processing steps:

In step S13, the prediction module 18 acquires the state at the time t, in particular, the prediction module acquires the current state vector $X_t$ at the time t.

In step S14, the prediction module 18 acquires the current velocity from the velocity estimation module 14.

In step S15, the prediction module 18 acquires the current movement model stored in the memory module 17. The prediction module 18 has completed the acquisition of the required input data after executing the steps S13, S14, and S15. The prediction module 18 may perform the steps s13, S14 and S15 at least partially in parallel, contrary to the illustration of FIG. 4 that assumes a sequential execution of processing steps S13, S14, and S15.

In step S16, the prediction module 18 performs the actual prediction of a next state.

In particular, the prediction module 18 predicts the next state vector $Y_t$.

Additionally, the prediction module 18 may generate additional (further) predictions in step S17. The additional prediction may include, e.g., a predicted end state of the current step or a predicted end time of the current step, which are predicted based on the movement model stored in the memory module 17.

In step S18, the prediction module 18 outputs the generated predictions including the predicted future state vector $Y_t$ and optionally the additional predictions to the predictive control unit 6 of the exoskeleton.

FIG. 5 displays a flowchart detailing operation of monitoring a movement based on the movement model stored in the memory module 17 of an embodiment.

The third processing path including processing steps S19, S20, and S21 is independent from the second processing path concerning the prediction process. The third processing path is quasi-independent from the first processing path concerning the movement model generating process. The third processing path essentially generates, collects, stores and provides information from the internal operations of the complete system, which are of relevance for monitoring and analysis of the movement. The third processing path as shown in the flowchart of FIG. 5 comprises the following processing steps, which are discussed with reference to the structural and functional elements illustrated in FIG. 2.

In step S19, the data interface 9 acquires the prototype time segments stored in the memory module 17 after a current pre-defined time interval has elapsed. The stored prototype time segments stored in the memory module 17 after the current pre-defined time interval has elapsed are the final prototype time segments.

In step S20, the data interface 9 acquires meta information associated with the steps that were used to generate the prototype time segments of the current time interval. Meta information may include the estimated velocity, for example.

In step S21, the data interface 9 outputs monitoring info to the exterior of the exoskeleton (outside world), in the example of FIG. 2 to the computer terminal 19 for data analysis of the gait information provided by the data interface 9 in form of the learned movement model including the stored final prototype time segments.

It is noted that the core estimation module 12, the data interface 9 and the prediction module 18 may be implemented in software comprising a plurality of software modules executed on a same processing circuit 3 or plurality of processing circuits 3 and interacting with a same memory 4.

Figure 6:
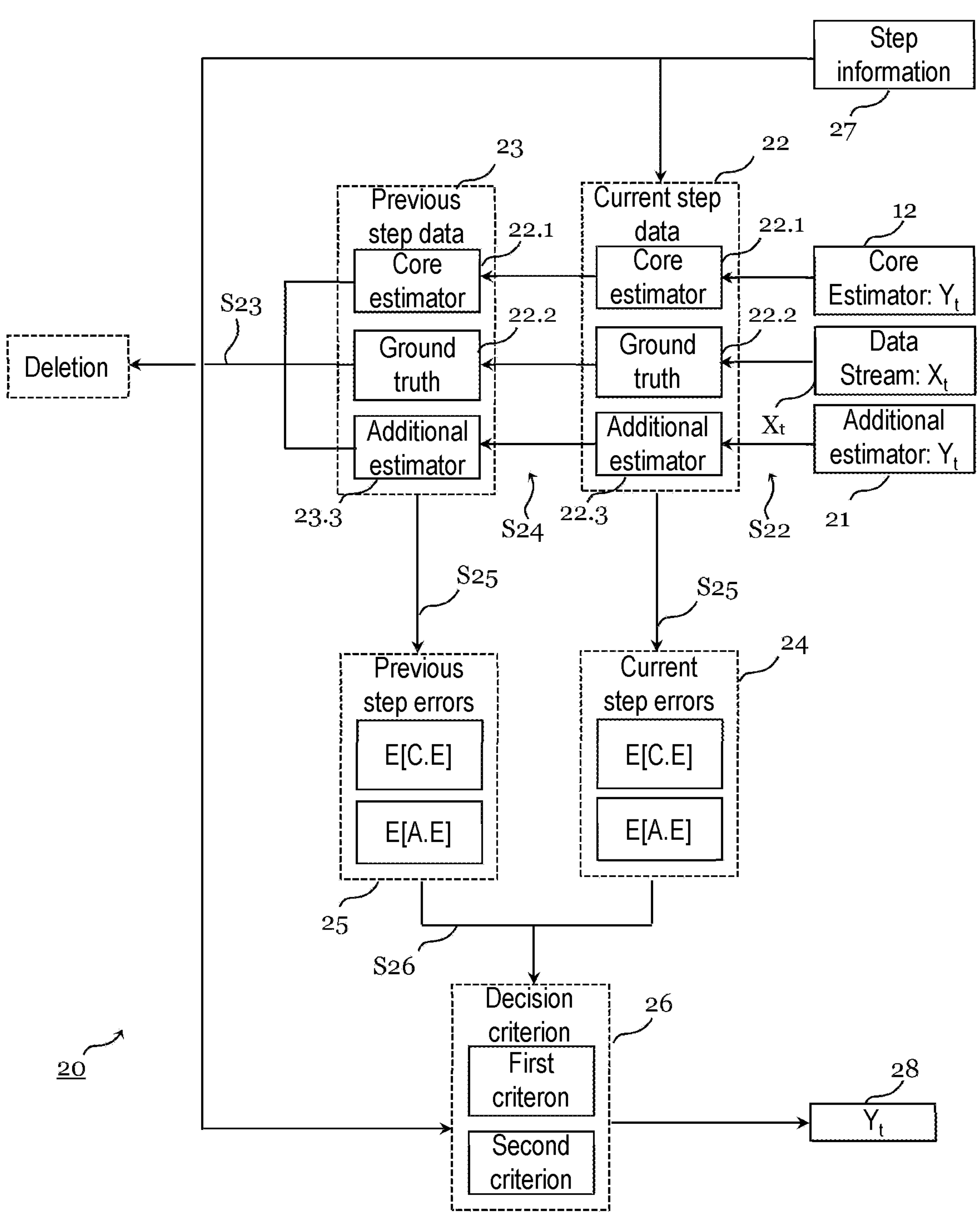
FIG. 6 displays a diagram of modular communications between functional elements of the aggregation module of an embodiment.
Figure 8:
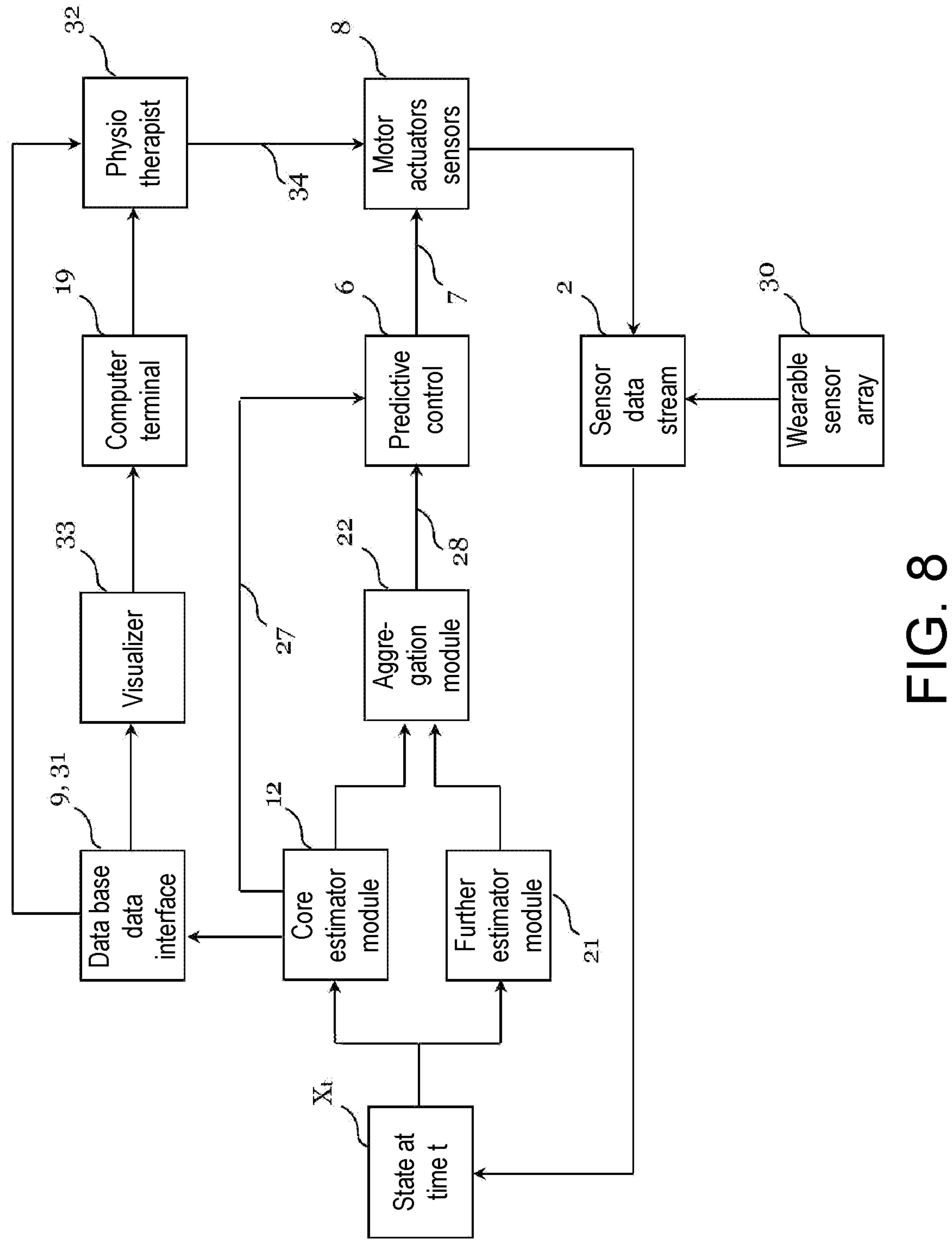
FIG. 8 shows a diagram illustrating modular communications between functional modules of embodiments in three distinct application scenarios.

FIG. 6 displays a diagram of modular communications between functional elements of an aggregation module 20 in an embodiment. The embodiment of FIG. 6 enables to use the core estimator module 12 in combination with another (additional) estimator module 21, as shown in FIG. 8 illustrating an exemplary embodiment in an application. The core estimator module 12 provides predictions including a predicted future state $Y_t$ to the aggregation module 20 that is generated based on the movement model stored in the memory module 17 and the current state $X_t$ provided in the sensor data stream. The additional estimator module 21 provides predictions including a further predicted future state $Y_t$ to the aggregation module 20 that is generated using a different prediction algorithm from the current state $X_t$ provided in the sensor data stream. The additional estimator module 21 may provide predictions including a further predicted future state $Y_t$ to the aggregation module 20 that are generated using a differing movement model (Second movement model) compared to that movement model (first movement model) currently stored in the memory module 17.

The aggregation module 20 is configured to decide, which of the predicted future states $Y_t$ obtained from the core estimator module 12 or the additional estimator module 21 should be used at any given point in time during operations of the exoskeleton, since, the core estimator module 12 can be used in conjunction with the additional estimator module 21.

The aggregation module 20 includes a current step data unit 22. The current step data unit 22 manages and stores three lists that all include the incoming information about a current physical step. A first list 22.1 stores the predictions including predicted future states $Y_t$, which the aggregation module 22 receives from the core estimator module 12. A second list stores ground truth data provided by the data stream signal 2. Ground truth data corresponds to actually measured state vectors $X_t$ provided by the sensor data stream. A third list 22.3 stores predictions including predicted future states $Y_t$ provided by the additional estimator module 21.

The aggregation module 20 includes a previous step data unit 23 of a generally similar structure as the current step data unit 22. In particular, the previous step data unit 23 comprises the corresponding structural components as the current step data unit 22. The previous step data unit 23 stores information about a previous physical step. In particular, the previous step data unit 23 manages and stores three lists that include stored information about the previous physical step. A first list 23.1 stores the predictions including predicted future states $Y_t$, which the aggregation module 22 received from the core estimator module 12 in the previous physical step. A second list 23.2 stores ground truth data provided by the data stream signal 2 for the previous physical step. Ground truth data corresponds to actually measured state vectors $X_t$ provided by the sensor data stream. A third list 23.3 stores predictions including predicted future states $Y_t$ provided by the additional estimator module 21 in the previous physical step.

The aggregation module 20 includes a current step error unit 24. The current step error unit 24 determines a total error of each of the first and second movement models on the predictions of the current physical step by comparing the predictions including the predicted future state vectors provided by each of the core estimator module 12 and the additional estimator module 21 with the ground truth data of the sensor data stream including the series of state vectors $X_t$.

The aggregation module 20 further includes a previous step error unit 25. This previous step error unit 25 operates in a corresponding manner to the current step error unit 24, however, the previous step error unit 25 determines the errors based on the previous physical step. The previous step error unit 25 determines a total error of each of the first and second movement models on the predictions of the previous physical step by comparing the predictions including the predicted future state vectors provided by each of the core estimator module 12 and the additional estimator module 21 in the previous physical step with the ground truth data of the sensor data stream including the series of state vectors $X_t$ of the previous physical step.

The aggregation module 20 further obtains step information 27, which includes information on the time segments corresponding to individual movement steps (physical steps) and the series of states $X_t$ included in the time segments.

The aggregation module 20 includes a decision unit 26. The decision unit 26 decides, which movement model is to be used by comparing both movement models. Comparing the movement models, in particular comparing the predictions respectively provided based on the first and the second movement model may include evaluating the respective errors determined by the current step error unit 22 and the previous step error unit 23.

A first criterion may include determining whether the current internal state $X_t$ represents a first time instance (step) of a new physical step based on the step information 27. If the current internal state $X_t$ represents the first time instance (step) of a new physical step, then the better movement model of the first movement model and the second movement model over the entire last physical step is selected for predicting future states $Y_t$. The selection regards that the assumption that two similar physical steps will follow each other will hold most of the time. Selecting the better movement model from the first movement model and the second movement model corresponds to determining which of the first and the second movement model provides smaller errors based on the predictions of the previous step as determined in the previous step error unit 25.

A second criterion evaluated in the decision unit 26 may determine if the current internal state $X_t$ is in the middle of a physical step based on the step information 27. In case of the decision unit 26 determining that the current internal state $X_t$ is in the middle of a physical step, then the better movement model of the first movement model and the second movement model over the current physical step is selected for predicting future states $Y_t$. Extended time horizons for the error are considered not make sense in this case because every step can contain new elements in the environment that cannot be handled by one of the first and second movement models.

Figure 7:
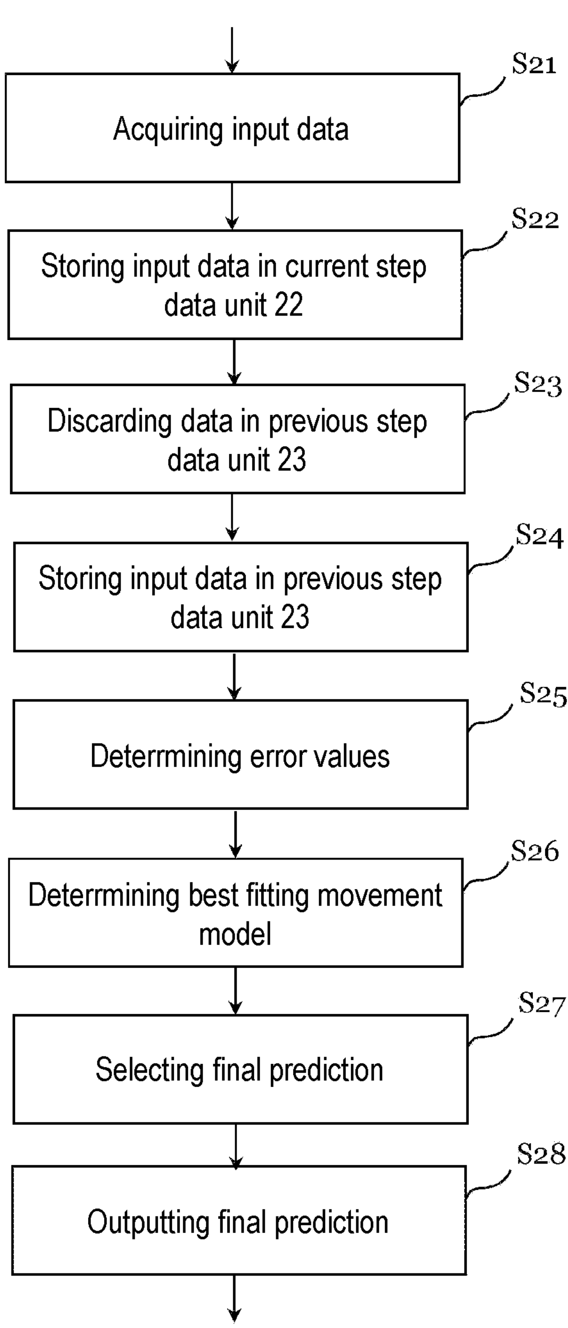
FIG. 7 displays a flowchart detailing operation the aggregation module of an embodiment.

FIG. 7 displays a flowchart detailing operation the aggregation module of an embodiment.

FIG. 7 depicts the processing sequence of the aggregation module 20 including the following steps:

Step S22 starts with acquiring the input data by the aggregation module 20. The input data includes the prediction from the core estimator module 12 at time t, the prediction from the additional estimator module 21 at time t, the ground truth data provided by the observed sensor data stream signal at time t and additional information in form of the step information 27 about whether the input at time t is the first time instance of a new physical step or not.

The ground truth data at time t corresponds to the predictions of a time t−1.

In step S23, the input data is stored into their respective sections in the current step data unit 22.

In step S24, the information about the (previous) previous step is discarded.

Step S25 includes, whenever a physical step is complete, sending all data to the previous step data unit 23 and storing the data in the corresponding sections of the previous step data unit 23.

In step S26, error values for both models on both, the current and the previous step, are computed by comparing predictions with ground truth data.

Subsequently, in step S27, the computed error values are provided to the decision unit 26, which determines the best fitting movement model based on the computed error values in step S27.

In step S28, the input prediction of the determined best fitting movement model is selected as a final prediction 28.

Then, in step S29, the final prediction is output by the aggregation module 22 to the predictive control unit 6.

FIG. 8 shows a diagram illustrating modular communications between functional modules of embodiments in combining distinct application scenarios in one diagram The core estimator module 12 enables different usage scenarios, each providing distinct advantages. In a first usage scenario, the core estimator module 12 acts as a tool to learn automatically movement cycles, e.g., human gait cycles, in order to facilitate control for lower body exoskeletons. In a second usage scenario, the core estimator module 12 functions as a tool to automatically learn and monitor human gait cycles based on data provided by wearable IMU sensors 30 for later inspection by a human professional. In a third usage scenario, the core estimator module 12 may combine both the first usage scenario and the second usage scenario. FIG. 8 provides an overview illustrating the communication flow for the three usage scenarios in one single block diagram. FIG. 8 shows distinct groups of entities that form part of the exoskeleton, a sensor 1, the core estimator module 12 and the aggregation module 22, the additional estimator module 21, and the actuators 8.

The exoskeleton includes its own set of sensors 1, preferably in form of an IMU sensor array. The wearable IMU sensor array 30 represents an alternative or addition for providing the sensor signal data stream 2.

The exoskeleton may include a plurality of motors driving actuators 8 and sensors 1.

The additional estimator module 21, e.g., storing a pre-learned offline movement model, may be optionally present.

FIG. 8 also shows the processing flow of the sensor data stream 2 and the internal states $X_t$ at the time t, and a human professional 32, which is enabled to inspect the visualized movement data provided by the visualizer 33.

The first usage scenario applies an embodiment for controlling the exoskeleton. In the first usage scenario, a human user wears the exoskeleton. IMU sensors 8 of the exoskeleton generate the sensor data stream 2. The generated sensor data stream 2 is fed into the core estimator module 12, one internal state vector $X_t$ including sensor data at a time t. The core estimator module 12 learns the movement model and predicts the obtained sensor data stream signal 2 into the future. Additionally, the core estimator module 12 predicts meta information like the end of the next time segment corresponding to a physical step. All predictions are provided to the predictive control unit 6, which uses the obtained predictions to generate a control signal 7 for electric motors of the exoskeleton that drive the actuators. The generated control signal 7 is used to adjust the motors 8 of the actuators and thereby to control the movement of the exoskeleton. Each time a new state of the exoskeleton is observed by the sensors of the exoskeleton, a respective new internal state vector $X_t$ including sensor data is fed to the core estimator module 12. The processing loop of operating the exoskeleton begins with a new cycle.

If the first usage scenario involves an embodiment with more than one estimator module 12, 21, the at least one additional estimator module 21 obtains the same data as the core estimator module 12. The at least one additional estimator module 21 generates and outputs its own prediction. Both predictions, the predictions from the core estimator module 12 and the predictions of the additional estimator module 21 are then provided as input data to the aggregation module 22. The aggregation module 22 then evaluates the movement models are evaluated based on their recent prediction errors and the final prediction 28 is selected. The selected final prediction 28 is then output to the predictive control unit 6 and used in a corresponding manner as above.

The workflow of the second usage scenario applies an embodiment for monitoring human gait, e.g., for rehabilitative purposes. The human user wears an IMU sensor array 30. This IMU sensor array generates a sensor data stream 2. The generated sensor data stream 2 is provided to the core estimator module 12, one internal state vector $X_t$ including sensor data at a time. The core estimator module 12 learns the human gait patterns of the user based on the obtained sensor data stream 2. The learned human gait pattern (human gait information) is stored in the database 31. From the database 31, the prototype time segments can be retrieved, and characteristic gait patterns of the user wearing the wearable sensor array 30 can be visualized using a visualizer 33. The visualizer 33 may include data processing capabilities for generating and displaying videos (video sequences) of a virtual skeleton, that is walking like the human user according to the prototype time segments stored in the database 31. The information on human gait patterns included in the stored prototype time segments may be inspected, possibly in addition to further meta information about the gait cycles that can then be inspected by a human professional 32 using a standard computer terminal 19. The visualizer 33 and the computer terminal 19 may be integrated in one structural computing device comprising at least one processor, memory and data input and output means, and respective software implementing the aforementioned functions.

An example application scenario may concern a patient with pathologic gait movement under treatment of a physiotherapist. The therapy sessions offered by the physiotherapist are usually just once per week. The offered schedule of therapy sessions appears insufficient to assess any changes in gait behavior after long days of the patient, or to track a progress due to therapy over periods like weeks or months. In this scenario, the patient can wear the IMU sensor array 30 every day and over the entire day. The physiotherapist can monitor the behavior and the progress achieved by the patient by inspecting the gait patterns that are visualized by the final prototype time segments of each day, or a similar meaningful period of time preset by the physiotherapist.

Yet another usage scenario combines in an embodiment for monitoring human gait for rehabilitative purposes the first and the second usage scenario. In case the human user wears the exoskeleton for rehabilitative purposes, both, the exoskeleton control according to the first usage scenario and the movement data monitoring functionality according to the second usage scenario may be utilized simultaneously.

Additionally, the physiotherapist may change settings of the exoskeleton, e.g., a maximum level of support provided by the exoskeleton based on the long-term monitoring of the gait behavior of the patient, as indicated by a setting control signal 34 in FIG. 8.

The incremental learning method for learning movement models, the prediction method based on the learned movement model for operating an exoskeleton, and the corresponding monitoring method provide economically advantageous applications. The incremental learning algorithm provides the capability of personalization of the movement model, as well as its adaptability to a variable application environment. The prediction algorithm is capable to automatically maximizing the prediction horizon without trading in prediction quality during operation. Moreover, the prediction works for arbitrary movement velocities of the person. The data interface 9 has the capability to aggregate efficiently large time intervals and movement data of human walk, which enable a concise human monitoring.

All features described above or features shown in the FIGURES can be combined with each other in any advantageous manner within the scope of the disclosure. In the detailed discussion of embodiments, numerous specific details were presented for providing a thorough understanding of the invention, which is defined in the claims. It is evident that putting the claimed invention into practice is possible without including all the specific details.

In the specification and the claims, the expression "at least one of A and B" may replace the expression "A and/or B" and vice versa due to being used with the same meaning. The expression "A and/or B" means "A, or B, or A and B".

What is claimed is:

1. A computer-implemented method for learning a movement model of a person, the method comprising steps of:

obtaining a data stream comprising a time series of measured movement data of the person from at least one sensor;

segmenting the obtained data stream into time segments, wherein each time segment corresponds to one movement step;

storing each time segment into a first storage section with a predetermined memory size;

performing clustering of the time segments stored in the first storage section into specific time intervals by computing distances between the time segments stored in the first storage section using a dynamic time warping algorithm, learning a two-dimensional non-linear topology preserving embedded feature vector based on the computed distances using a uniform manifold approximation and projection algorithm to reduce the time segments stored in the first data storage section to n feature vectors in two-dimensional space, clustering the n feature vectors using an affinity propagation algorithm that determines a number of clusters automatically, aligning time segments of each cluster using a dynamic time warping algorithm and averaging the aligned time segments of each cluster for generating a prototype time segment for each cluster;

generating and storing in a memory a movement model by comparing the determined number of clusters of a current clustering with the determined number of clusters from the previous clustering stored in a second storage section, and in case the determined number of clusters of the current clustering is equal the determined number of clusters from the previous clustering, merging individually the prototype time segments of the current clustering with the corresponding prototype time segments of the previous clustering, in case of the determined number of clusters of the current clustering exceeding the determined number of clusters from the previous clustering, merging individually the prototype time segments of the current clustering with the corresponding prototype time segments of the previous clustering, and adding the current prototype time segments of the current clustering that have no corresponding prototype time segments in the previous clustering, in case the determined number of clusters of a current clustering is smaller than the determined number of clusters from the previous clustering, merging individually the prototype time segments of the current clustering with the corresponding prototype time segments of the previous clustering, and retaining the previous prototype time segments of the previous clustering that have no corresponding prototype time segments in the current clustering, storing the time segments and the learned embedded feature vectors of a previous clustering into a second storage section;

storing the generated prototype time segments for each cluster of a previous clustering into a third storage section;

counting and storing a number of the movement measurements of each time segment;

determining, for a new obtained vector of measured multidimensional movement data, a nearest neighbor from the prototype time segments stored in the memory;

retrieving the counted number of movement measurements from a previous cycle; and determining a predicted movement vector as a vector of measured multidimensional movement data included in the prototype time segment of the determined nearest neighbor that is int (predetermined data size/counted number of the movement measurements) later than the determined nearest neighbor.

2. The computer-implemented method according to claim 1, wherein the step of generating and storing further comprises interpolating each prototype time segment and resampling the interpolated prototype time segment to a predetermined data size.

3. The computer-implemented method according to claim 2, wherein the predetermined data size exceeds a value that results from a slow human walk sampled at a characteristic sampling frequency of an IMU sensor.

4. The computer-implemented method according to claim 2, wherein the predetermined data size corresponds to 200 data points.

5. The computer-implemented method according to claim 1, wherein a characteristic sampling frequency of the at least one sensor at 60 Hz.

6. The computer-implemented method according to claim 1, wherein the method further comprises:

determining further predicted movement vectors of the prototype time segment of the determined nearest neighbor in case determining, for a new obtained vector of measured multidimensional movement data, a nearest neighbor from the prototype time segments stored in the memory results in determining the nearest neighbor from the same prototype time segment plural times in a row, in particular at least a predetermined number directly one after another.

7. The computer-implemented method according to claim 6, wherein the predetermined number is five.

8. The computer-implemented method according to claim 6, wherein the method further comprises:

estimating and outputting based on the determined nearest neighbor being from the same prototype time segment plural times in a row, an estimation how and when the current movement associated with the current time segment is predicted to end.

9. The computer-implemented method according to claim 1, wherein the method further comprises:

storing and outputting, by a data interface, the prototype time segments stored in the memory after a predefined time interval has elapsed.

10. The computer-implemented method according to claim 9, wherein the predefined time interval corresponds to one day, one week, or one month.

11. The computer-implemented method according to claim 9, wherein the method further comprises:

storing and outputting, by the data interface, meta information for the current predefined time interval of each or all movements associated with the prototype time segments stored in the memory after a predefined time interval has elapsed.

12. The computer-implemented method according to claim 11, wherein the meta information comprises at least one of number of movements and duration of movements.

13. The computer-implemented method according to claim 1, wherein the method determines the nearest neighbor using a k nearest neighbor algorithm (kNN).

14. The computer-implemented method according to claim 1, wherein the method is performed online during movement of the person.

15. The computer-implemented method according to claim 1, wherein the at least one sensor includes an IMU sensor array.

16. The computer-implemented method according to claim 1, wherein the method comprises:

estimating a velocity of the movement by counting a number of the movement measurements of each time segment for a constant sampling rate of the at least one sensor.

17. A non-transitory computer-readable storage medium embodying a program of machine-readable instructions executable by a digital processing apparatus, causing the digital processing apparatus to perform operations according to claim 1.

18. An exoskeleton, comprising:

a plurality of actuators;

a predictive controller configured to control the plurality of actuators based on a movement prediction signal;

at least one sensor for generating a data stream comprising a time series of measured multi-dimensional movement data of the person;

a human movement analyzing system comprising at least one processor and at least one memory, wherein the movement analysis system is configured to perform the method according to claim 1 for generating the movement prediction signal including the predicted movement vector.

19. The exoskeleton according to claim 18, wherein the at least one processor is configured to run software including a core estimator module for generating a first movement prediction signal including the predicted movement vector;

at least one further estimator module for generating a second movement prediction signal including a second predicted movement vector; and an aggregation module configured to generating the movement prediction signal by selecting either the first movement prediction signal or the second movement prediction signal, and outputting the selected first movement prediction signal or second movement prediction signal to the predictive controller, wherein the aggregation module is configured to monitor a quality of a prediction of the first movement prediction signal and the second movement prediction signal, and to select the either the first movement prediction signal or the second movement prediction signal based on the monitored quality.

20. A human movement analyzing system, comprising:

at least one processor and at least one memory, wherein the movement analysis system is configured to perform the method according to claim 1 for generating the movement model; and a data interface including the memory for storing and outputting the stored movement model via a human-machine interface.

* * * * *